United States Patent Office 3,329,570
Patented July 4, 1967

3,329,570
THERAPEUTIC COMPOSITIONS COMPRISING
21-DICYCLOHEXYLMETHYL CARBONATE
ESTERS OF PREGNANE DERIVATIVES
André Allais, Les Lilas, and Michel Paturet, Sucy-en-Brie,
France, assignors to Roussel-Uclaf, Paris, France, a
corporation of France
No Drawing. Filed Dec. 18, 1964, Ser. No. 419,556
Claims priority, application France, Dec. 19, 1963,
957,778; Jan. 2, 1964, 959,162; Mar. 3, 1964,
965,895
15 Claims. (Cl. 167—65)

The present invention relates to novel 21-dicyclohexyl-methyl carbonate esters of corticosteroids of the pregnane series, intermediates and the process for their production. The particular 21-dicyclohexylmethyl carbonate esters have an enhanced retarded anti-inflammatory effect, particularly on local applications.

A considerable number of steroid alcohol esters have already been suggested, in particular in the 17 or 3 position for the estradiol series, the 17 position for the androstane series, or in the 21 position for the corticosteroid series, the esterification being generally for the purpose of rendering these compounds soluble or to provide them with a prolonged duration of action.

An object of the present invention is the obtention of a 21-dicyclohexylmethyl carbonate ester of a corticosteroid of the pregnanic series of the partial formula

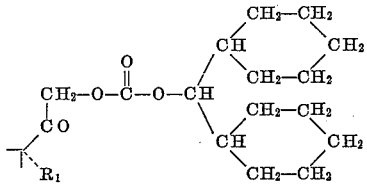

wherein $R_1$ is a member selected from the group consisting of hydroxy and hydrogen, and the remainder of the molecule represents a corticosteroid of the pregnanic series.

Another object of the invention is the obtention of a 21-dicyclohexylmethyl carbonate ester of a steroid of the formula

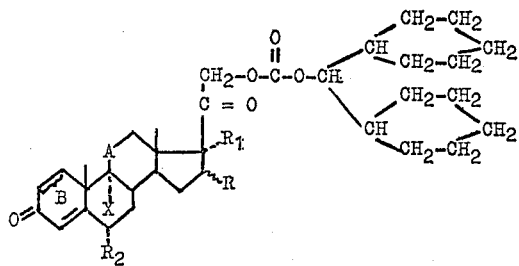

wherein X is selected from the group consisting of hydrogen and halogen, A is selected from the group consisting of

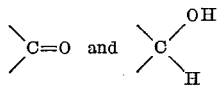

B is selected from the group consisting of two hydrogens and a double bond, R is selected from the group consisting of hydrogen, α- or β-hydroxy and α- or β-methyl, $R_2$ is selected from the group consisting of hydrogen, halogen and methyl, $R_1$ is selected from the group consisting of hydroxy and hydrogen.

A yet further object of the invention is the obtention of the intermediate dicyclohexylmethyl chloroformiate.

A still further object of the invention is the development of a process for the production of a 21-dicyclohexyl-methyl carbonate ester of a corticosteroid of the pregnanic series of the partial formula

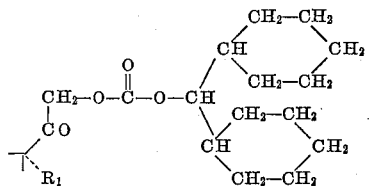

wherein $R_1$ is a member selected from the group consisting of hydroxy and hydrogen, and the remainder of the molecule represents a corticosteroid of the pregnanic series, which comprises the steps of reacting dicyclohexyl-methyl chloroformiate with a corticosteroid of the partial formula

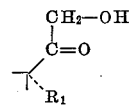

wherein $R_1$ has the above-assigned value and the remainder of the molecule represents a corticosteroid of the pregnanic series in the presence of a tertiary organic base and an inert organic solvent and recovering said 21-dicyclohexylmethyl carbonate ester.

Another object of the invention is the obtention of an anti-inflammatory composition comprising a therapeutic amount of a 21-dicyclohexylmethyl carbonate ester of a corticosteroid of the pregnanic series of the partial formula

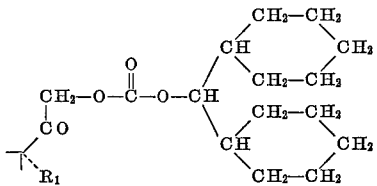

wherein $R_1$ is a member selected from the group consisting of hydroxy and hydrogen, and the remainder of the molecule represents a corticosteroid of the pregnanic series, and a major amount of an inert pharmaceutical excipient.

These and other objects of the invention will become more apparent as the description thereof proceeds.

The present invention relates to new esters in 21 position of pregnanic derivatives, more particularly to the 21-dicyclohexylmethyl carbonates of corticosteroids of the general Formula I

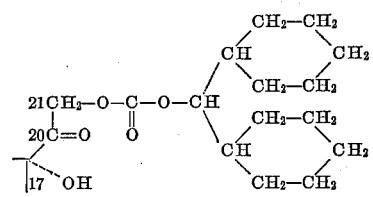

the rest of the molecule presenting any pregnanic structure and in particular those having substituents or combinations of substituents established on the nucleus in positions 1 to 16 and especially free or substituted hydroxy groups in 11 or 16 positions, ketones in 3 or 11 positions, halogen atoms in 6 or 9 positions, lower alkyl groups in the 6 or 16 positions, and double bonds in the 1, 1,4 or in the 1,4,6 positions.

More particularly the present invention relates to the 21-dicyclohexylmethyl carbonate esters of steroids of the formula

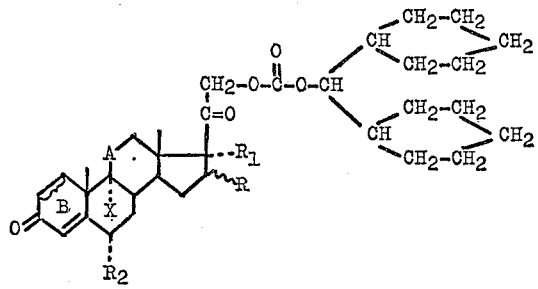

wherein X is selected from the group consisting of hydrogen and halogen, A is selected from the group consisting of

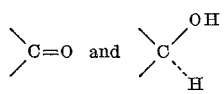

B is selected from the group consisting of two hydrogens and a double bond, R is selected from the group consisting of hydrogen, α- or β-hydroxy and α- or β-methyl, $R_2$ is selected from the group consisting of hydrogen, halogen and methyl, $R_1$ is selected from the group consisting of hydroxy and hydrogen.

These new esters possess useful pharmacodynamic properties. Moreover, they are characterized by a very favorable, retarded or prolonged anti-inflammatory effect, which allows the spacing of the intervals of their administration.

Among these compounds, of particular interest are the 21-dicyclohexylmethyl carbonate ester of dexamethasone, and the 21-dicyclohexylmethyl carbonate ester of prednisolone, especially for the treatment of inflammatory ailments of rheumatic, arthritic or infectious origin.

The invention relates also to a process for the preparation of the new esters of the general Formula I. This process is characterized essentially in that the selected pregnanic derivative having a free hydroxyl in the 21-position is brought to reaction with dicyclohexylmethyl chloroformiate in the presence of a tertiary organic base such as the pyridine, preferably working with an inert organic solvent such as dioxane or acetone.

Thus, by reacting dexamethasone or prednisolone or cortisone, or 6α-methyl prednisolone with dicyclohexylmethyl chloroformiate, the 21-dicyclohexylmethyl carbonate ester of dexamethasone, or prednisolone or cortisone or 6α-methyl prednisolone respectively is obtained.

By starting out with other corticosteroids of the pregnanic series, such as hydrocortisone, 9α-fluoro-hydrocortisone, prednisone, 9α-fluoroprednisone, 9α-fluoroprednisolone, 16β-methyl 9α-fluoroprednisolone 16α-methyl 6α-fluoro prednisolone and 9α-fluoro 16α-hydroxy prednisolone, the corresponding 21-dicyclohexylmethyl carbonate esters are obtained according to the process of the invention.

As indicated in the preceding, the new products, object of the invention, possess interesting pharmacological properties. In particular they possess a remarkable and prolonged anti-inflammatory action. The esterification of the alcohol function in the 21-position by a carbonate of di-cyclohexylmethyl alcohol of high molecular weight prolongs to an important degree the duration of action, at the same time maintaining a high intensity of action. This retarded or prolonged anti-inflammatory action is principally evident on local administration.

The products of the invention may be utilized for the treatment of radicular pains, of acute or chronic polyarthritis, of acute or chronic rheumatic ailments, as well as of lumbar sciatica. They also are employed for the treatment of inflammatory ailments, infectious dermatoses, asthma, emphysema, fibrosis and bronchial pneumopathies. Furthermore, they may be used for their local anti-inflammatory action on the skin and the mucous membranes and particularly for the treatment of inflammatory ailments of the anterior segment of the eye.

The carbonate esters of the general Formula I are utilized orally, transcutaneously, locally by topical application on the skin and mucous membranes, or by rectal administration. Preferably, they are used as an intra-articular injection.

They may be prepared in the form of injectionable solutions or suspensions, supplied in ampoules and in multiple dose phials, tablets, coated tablets, suppositories, pomades, creams, collyriums and topical powders for dusting.

The useful dosology is controlled between one and forty milligrams per dose for the adult dependent on the mode of administration, the doses being, as a rule, spaced in proportion to the retarded effect.

The pharmaceutical forms, such as injectable solutions or suspensions, tablets, coated tablets, suppositories, pomades, creams, collyriums and topical powders, are prepared according to the customary processes.

The following examples will serve for better comprehension of the invention. They do not represent any limitative characteristics.

EXAMPLE I

Preparation of the 21-dicyclohexylmethyl carbonate of dexamethasone

Step A: Preparation of dicyclohexylmethyl chloroformiate.—77 cc. of a toluene solution containing 10% of phosgene and 6.8 gm. of N,N-dimethylaniline were mixed. 10 gm. of dicyclohexylmethanol, dissolved in 77 cc. of toluene, were added to this mixture. The mixture was allowed to stand overnight at room temperature. The precipitate was vacuum filtered and washed with toluene. The organic phases were combined and the excess of phosgene was eliminated by allowing nitrogen to bubble therethrough for 1 hour. Thereafter the organic phase was washed first with N hydrochloric acid, then with water until the wash waters were neutral, dried over sodium sulfate, filtered and concentrated to dryness under vacuum. 13.1 gm. of product were obtained which crystallized under refrigeration at 0° C., being dicyclohexylmethyl chloroformiate. The product was purified by recrystallization from iso-octane. The dicyclohexylmethyl chloroformiate occurred in the form of a product crystallized in colorless prisms, soluble in either, acetone, benzene and chloroform, melting about 30° C.

Analysis.—$C_{14}H_{23}O_2Cl$; molecular weight=258.78. Calculated: C, 64.97%; H, 8.96%; Cl, 13.70%. Found: C, 64.9; H, 9.0; Cl, 13.4.

This product is not described in the literature.

The starting product, the dicyclohexylmethanol, was obtained according to the process described by Sabatier et al., C. R. Ac. Sciences 139, 345 (1904).

Step B: Preparation of the 21-dicyclohexylmethyl carbonate of dexamethasone.—5 gm. of dexamethasone were dissolved in 10 cc. of pyridine and 20 cc. of dioxane, cooled at 0° C. Then, slowly, a solution of 3.8 gm. of dicyclohexylmethyl chloroformiate in 15 cc. of dioxane was added. Thereafter the reaction mixture was allowed to stand for 14 hours at room temperature. The suspension obtained was poured under agitation into a solution of 11 cc. of hydrochloric acid in 600 cc. of water. The precipitate was vacuum filtered, washed with water until the wash waters were neutral and dried under vacuum at 60° C. 8.1 gm. of product were recovered which product was purified by recrystallization from refluxing methanol. In this way, 5 gm. of the 21-dicyclohexylmethyl carbonate of dexamethasone were obtained in the form of a product crystallized in colorless prisms and solvated with one molecule of methanol, soluble in ether, benzene, acetone and chloroform, slighlty soluble in alcohol and insoluble in water, having a melting point of 170–180° C. and a specific rotation $[\alpha]_D^{20} = +72° \pm 1$ (in dioxane).

Analysis of the product desolvated by heating under vacuum at 120° C.—$C_{36}H_{51}O_7$; molecular weight=614.77.

Calculated: C, 70.33%; H, 8.36%; F, 3.09%. Found: C, 70.0; H, 8.3; F, 3.3.

This product is not described in the literature.

EXAMPLE II

Preparation of the 21-dicyclohexylmethyl carbonate of prednisolone 4.5 gm. of prednisolone were dissolved in 9 cc. of pyridine and 18 cc. of dioxane, cooled to 0° C. Then, a solution of 3.8 gm. of dicyclohexylmethyl chloroformiate in 15 cc. of dioxane was slowly added. The suspension obtained was allowed to stand overnight at 0° C. The mixture was then slowly poured into a solution of 11 cc. of hydrochloric acid in 600 cc. of water. The precipitate formed was vacuum filtered, washed with water until the wash waters were neutral and dried overnight at 60° C. under vacuum. 7 gm. of a raw product melting at 242° C.±2° C. were isolated and purified by subjecting it to chromatography through alumina with elution with methylene chloride. 4.5 gm. of crystallized product were obtained which, under reflux, was dissolved in 15 volumes of ethanol. The solution was filtered in the hot concentrated and allowed to stand overnight at room temperature. The product crystallized. The precipitate was vacuum filtered, washed with iced ethanol and dried overnight under vacuum at room temperature. 2.3 gm. of the 21-dicyclohexylmethyl carbonate of prednisolone, containing 0.5 molecule of crystallization water were obtained in form of a product crystallized in colorless needles, soluble in alcohol and chloroform and insoluble in water, dilute aqueous acids and alkalis, ether and benzene, having a melting point of 245–248° C., and a specific rotation $$[\alpha]_D^{20} = +93.3° \pm 1.5°$$

(c.=1% in dioxane).

Analysis of the product desolvated by heating under vacuum at 120° C.—$C_{35}H_{50}O_7$; molecular weight=582.75.

Calculated: C, 72.13%; H, 8.65%. Found: C, 72.1; H, 8.8.

This product is not described in the literature.

EXAMPLE III

Preparation of the 21-dicyclohexylmethyl carbonate of cortisone 2 gm. of cortisone were dissolved in 4 cc. of pyridine and 8 cc. of dioxane, cooled to 0° C. Then, slowly, a solution of 1.7 gm. of dicyclohexylmethyl chloroformiate in 7 cc. of dioxane was added, and the mixture was allowed to stand for 15 hours at 0° C. Next, under agitation, the reaction mixture was slowly poured into a solution of 5 cc. of hydrochloric acid in 300 cc. of water. The precipitate formed was filtered, washed with water until the wash waters were neutral and dried under vacuum at 60° C. 2.95 gm. of the 21-dicyclohexylmethyl carbonate of cortisone were obtained, which could be purified by subjecting it to chromatography and recrystallization.

The compound occurred in the form of colorless crystals, insoluble in water and soluble in chloroform and acetone. The ultraviolet spectra was in accord with the structure.

The product is not described in the literature.

EXAMPLE IV

Preparation of the 21-dicyclohexylmethyl carbonate of 6α-methyl prednisolone 1.5 gm. of 6α-methyl prednisolone were dissolved in 3 cc. of pyridine and 6 cc. of dioxane, cooled at 0° C. A solution of 1.2 gm. of dicyclohexylmethyl chloroformiate in 5 cc. of dioxane was slowly added under agitation and then the mixture was allowed to stand for 15 hours at room temperature. The reaction mixture was then poured, while agitated, into a solution of 3.3 cc. of hydrochloric acid in 180 cc. of water. The precipitate thus formed was vacuum filtered, washed with water until the wash waters were neutral and dried under vacuum. 2.2 gm. of the 21-dicyclohexylmethyl carbonate of 6α-methyl prednisolone were obtained, which was purified by recrystallization. The compound occurred in the form of colorless crystals, insoluble in water and soluble in chloroform and acetone; its ultraviolet spectra was in accord with the structure.

This product is not described in the literature.

EXAMPLE V

Pharmacological study of the 21-dicyclohexylmethyl carbonate of dexamethasone

*Anti-inflammatory action: Local Retarded Effect.*—The test of the granuloma on cotton was utilized, similar to that described by Singer, Proceed. Soc. Exp., Biol., Med., 1956, 92, 23, as modified by Arth, J. Am. Chem. Soc., 1958, 80, 3161, and the technique of the study of the local retarded effect described by Winter et al., J. Am. Pharm. Ass., Sc. Ed., 1957, 46, 515.

Female rats, weighing between 140–150 gm., received by ventral, subcutaneous implantation, 2 sterile pellets of cotton, each weighing 10 mg. One of these pellets was impregnated with the product in suspension, utilized at increasing concentrations in a standard volume of 0.02 cc. The pellet was also impregnated by a solution of antibiotics (potassium penicillinate and streptomycine sulfate). The second pellet was impregnated only by the dispersant and by the same solution of antibiotics (control pellet). The impregnation was followed by a desiccation in the incubator at 37° C.

Groups of 6 to 8 rats were used for each dose of the product and one group was used for the control, whose two pellets had been solely impregnated with the dispersant.

The animals were sacrificed 7 days after the implantation. The pellets were separated with the granuloma tissue which encircled them, and they were weighed in both the fresh and dry condition. The weight of the cotton was deducted. The weights of the granuloma of the pellet impregnated with the product under study were expressed as a percentage of the weight of the control pellet.

The 50% active dose ($DA_{50}$) was the dose which diminishes by 50% the weight of the granuloma with reference to that of the control pellet of the treated rats, and it is determined graphically.

In the case of the elevated doses, the amount of product which was reabsorbed from the pellet could be sufficient to exercise a general effect which was revealed by the involution of the thymus and by the decrease of the weight of the granuloma of the control pellet of the treated rat in comparison to those of the control rats. The dose, which exerted a general effect, was also noted.

The local retarded anti-inflammatory activity of the 21-dicyclohexylmethyl carbonate of dexamethasone was compared with that of hydrocortisone acetate, prednisolone acetate, prednisolone ter-butyl acetate and dexamethasone acetate.

The following table gives a resume of the results obtained:

| Products | 50% active dose (DA$_{50}$) in γ/pellet (x) | Dose having exercised a general action in γ/pellet (x) |
| --- | --- | --- |
| Hydrocortisone acetate | 250 | >500 |
| Prednisolone acetate | 750 | 1,000 |
| Prednisolone ter-butyl acetate | 20 | >100 |
| Demamethasone acetate | >50 | 50 |
| The 21-dicyclohexyl-methyl carbonate of dexamethasone | 2 | 50 |

(x)—The active doses are expressed in molecular equivalents of the respective basic steroids (free alcohol).

From this table it can be noted that the 21-dicyclohexylmethyl carbonate of dexamethasone exerts a remarkable local retarded or prolonged anti-inflammatory action.

*Determination of the toxicity.*—The 21-dicyclohexylmethyl carbonate of dexamethasone, in suspension in an aqueous dispersant liquid, was administered subcutaneously at a dose of 20 mg./kg., to a group of 10 mice of the Rockland strain, weighing between 18 and 22 gm. each.

The animals were held under observation for 8 days. No mortality was noted.

The product was well tolerated by the mice in an acute experiment at a dose of 20 mg./kg., administered by subcutaneous means.

EXAMPLE VI

*Pharmacological study of the 21-dicyclohexylmethyl carbonate of prednisolone*

*Local retarded anti-inflammatory action.*—The same test of the granuloma on cotton was used as described above.

The local retarded or prolonged anti-inflammatory action of the 21-dicyclohexylmethyl carbonate of prednisolone was compared with that of hydrocortisone acetate, prednisolone acetate and prednisolone ter-butyl acetate.

The following table summarizes the results obtained.

| Products | 50% Active dose (DA$_{50}$) in γ/pellet * |
| --- | --- |
| Hydrocortisone acetate | 250 |
| Prednisolone acetate | 750 |
| Prednisolone ter-butyl acetate | 20 |
| 21-dicyclohexylmethyl carbonate of prednisolone | 4 |

*The active doses are expressed in molecular equivalents of the respective basic steroids, as the free alcohol.

It was thus noted that the 21-dicyclohexylmethyl carbonate of prednisolone exercises a remarkable local retarded or prolonged anti-inflammatory action.

The preceding specific embodiments are illustrative of the invention. It is to be understood, however, that other expedients known to those skilled in the art, such as utilization of other corticosteroids of the pregnanic series, may be employed without departing from the spirit of the invention or the scope of the appended claims.

We claim:

1. A 21-dicyclohexylmethyl carbonate ester of a steriod of the formula wherein the wavy line appearing at the 16 position is generic to the α and β configuration, X is selected from the group consisting of hydrogen and halogen, A is selected from the group consisting of $$\diagup\!\!\!\!C=O \quad \text{and} \quad \diagup\!\!\!\!C\diagdown\!\!\!^{OH}_{H}$$

B is selected from the group consisting of two hydrogens and a double bond, R is selected from the group consisting of hydrogen, hydroxy and methyl, R$_2$ is selected from the group consisting of hydrogen, halogen and methyl, R$_1$ is selected from the group consisting of hydroxy and hydrogen.

2. The 21-dicyclohexylmethyl carbonate of dexamethasone.

3. The 21-dicyclohexylmethyl carbonate of prednisolone.

4. The 21-dicyclohexylmethyl carbonate of cortisone.

5. The 21-dicyclohexylmethyl carbonate of hydrocortisone.

6. The 21-dicyclohexylmethyl carbonate of 9α-fluorohydrocortisone.

7. The 21-dicyclohexylmethyl carbonate of prednisone.

8. The 21-dicyclohexylmethyl carbonate of 9α-fluoroprednisone.

9. The 21-dicyclohexylmethyl carbonate of 9α-fluoroprednisolone.

10. The 21-dicyclohexylmethyl carbonate of 16β-methyl 9α-fluoroprednisolone.

11. The 21-dicyclohexylmethyl carbonate of 16α-methyl 6α-fluoro prednisolone.

12. The 21-dicyclohexylmethyl carbonate of 6α-methylprednisolone.

13. The 21-dicyclohexylmethyl carbonate of 9α-fluoro-16α-hydroxy-prednisolone.

14. An anti-inflammatory composition comprising a therapeutic amount of a 21-dicyclohexylmethyl carbonate ester of a steroid of the formula wherein the wavy line appearing at the 16 position is generic to the α and β configuration, X is selected from the group consisting of hydrogen and halogen, A is selected from the group consisting of

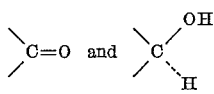

B is selected from the group consisting of two hydrogens and a double bond, R is selected from the group consisting of hydrogen, hydroxy and methyl, $R_2$ is selected from the group consisting of hydrogen, halogen and methyl, $R_1$ is selected from the group consisting of hydroxy and hydrogen, and a major amount of an inert pharmaceutical excipient.

15. A process of treating inflammatory ailments which comprises administering from about one to about forty milligrams of a 21-dicyclohexylmethyl carbonate ester of a steroid of the formula

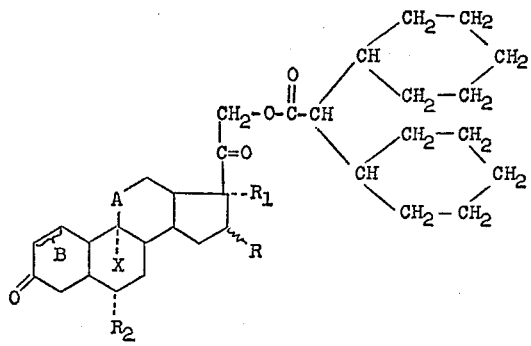

wherein the wavy line appearing at the 16 position is generic to the $\alpha$ and $\beta$ configuration, X is selected from the group consisting of hydrogen and halogen, A is selected from the group consisting of

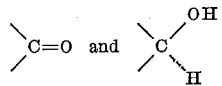

B is selected from the group consisting of two hydrogens and a double bond, R is selected from the group consisting of hydrogen, hydroxy and methyl, $R_2$ is selected from the group consisting of hydrogen, halogen and methyl, $R_1$ is selected from the group consisting of hydroxy and hydrogen.

References Cited

UNITED STATES PATENTS 3,056,727 10/1962 Allais et al. _____ 167—74
3,105,083 9/1963 Lincoln _____ 260—397.45

LEWIS GOTTS, *Primary Examiner.*

E. L. ROBERTS, *Assistant Examiner.*